(12) United States Patent
Kiethley et al.

(10) Patent No.: US 8,427,706 B1
(45) Date of Patent: Apr. 23, 2013

(54) ERROR DIFFUSION HALFTONING TECHNIQUES AND CONFIGURATIONS

(75) Inventors: Douglas G. Kiethley, Boise, ID (US); Randall D. Briggs, Boise, ID (US)

(73) Assignee: Marvell International Ltd., Hamilton (BM)

( * ) Notice: Subject to any disclaimer, the term of this patent is extended or adjusted under 35 U.S.C. 154(b) by 974 days.

(21) Appl. No.: 12/490,188

(22) Filed: Jun. 23, 2009

Related U.S. Application Data

(60) Provisional application No. 61/077,778, filed on Jul. 2, 2008.

(51) Int. Cl.
| | |
|---|---|
| H04N 1/405 | (2006.01) |
| G06K 9/00 | (2006.01) |
| G03G 13/04 | (2006.01) |
| G09G 5/00 | (2006.01) |

(52) U.S. Cl.
USPC ......... 358/3.22; 358/1.9; 358/3.23; 358/3.03; 358/3.04; 358/534; 358/536; 382/251; 382/252; 382/270; 382/172; 347/131; 345/616

(58) Field of Classification Search ........................ None
See application file for complete search history.

(56) References Cited

U.S. PATENT DOCUMENTS

| | | | | |
|---|---|---|---|---|
| 4,878,125 A | * | 10/1989 | Katayama et al. | 358/443 |
| 5,809,177 A | * | 9/1998 | Metcalfe et al. | 382/251 |
| 5,880,857 A | * | 3/1999 | Shiau et al. | 358/3.03 |
| 6,943,918 B1 | * | 9/2005 | Kakutani | 358/3.02 |
| 7,319,549 B2 | * | 1/2008 | Thakur | 358/3.03 |
| 2005/0195443 A1 | * | 9/2005 | Saneto | 358/3.14 |

OTHER PUBLICATIONS

IEEE Std 802.11b-1999, Part 11: Wireless LAN Medium Access Control (MAC) and Physical Layer (PHY) specifications: Higher-Speed Physical Layer Extension in the 2.4GHz Band, Sep. 16, 1999, pp. 1-96, The Institute of Electrical and Electronics Engineers, Inc., New York, NY.

IEEE Std 802.11b-1999/Corrigendum 1-2001, Part 11: Wireless LAN Medium Access Control (MAC) and Physical Layer (PHY) specifications, Amendment 2: Higher-speed Physical Layer (PHY) extension in the 2.4 GHz band—Corrigendum 1, Nov. 7, 2001, pp. 1-23, The Institute of Electrical and Electronics Engineers, Inc., New York, NY.

IEEE P802.11g/D8.2, Part 11: Wireless LAN Medium Access Control (MAC) and Physical Layer (PHY) specifications: Further Higher Data Rate Extension in the 2.4 GHz Band, Apr. 2003, pp. 1-69, The Institute of Electrical and Electronics Engineers, Inc., New York, NY.

* cited by examiner

*Primary Examiner* — Steven Kau

(57) ABSTRACT

Embodiments of the present invention provide techniques and configurations for error diffusion halftoning of an image including receiving a signal that indicates selection of a first implementation or a second implementation of determining a threshold perturbation value for error diffusion halftoning of an image, and determining the threshold perturbation value using a table of programmable values according to the selected one of the first implementation or the second implementation, wherein the second implementation provides fewer threshold perturbation values for a larger region of the image than the first implementation. Other embodiments may be described and/or claimed.

16 Claims, 5 Drawing Sheets

ERROR DIFFUSION HALFTONING TECHNIQUES AND CONFIGURATIONS

CROSS REFERENCE TO RELATED APPLICATIONS

This disclosure claims priority to U.S. Patent Application No. 61/077,778 filed Jul. 2, 2008, entitled "FIXED PATTERN ERROR DIFFUSION THRESHOLD PERTURBATION" and U.S. Patent Application No. 61/077,780 filed Jul. 2, 2008, entitled "POSITION DEPENDENT ERROR DIFFUSION" the entire specifications of which are hereby incorporated by reference in their entirety for all purposes, except for those sections, if any, that are inconsistent with this specification.

TECHNICAL FIELD

Embodiments of the present invention generally relate to image processing, and more particularly, to techniques and configurations for error diffusion halftoning.

BACKGROUND

Error diffusion generally operates to place dots or other patterns of a set of tones in a manner that creates the appearance of a larger number of shades or tones for an image. A variety of techniques exist to reduce undesirable visual artifacts associated with error diffusion. For example, visual artifacts can be reduced by serpentine traversal, application of a larger number of fixed error term weights, threshold perturbation, and tone dependent changes to the error term weights.

Printing devices, such as laser printers, typically exhibit better image quality with larger dots that can be finely adjusted in size, thus favoring clustered and fixed type dot arrangements for error diffusion. However, fixed dot locations for copying devices may cause undesirable moiré patterns in the image, for example, when copying an image that itself was printed with fixed dot locations. Thus, a more random nature type error diffusion of smaller dots may be preferable in such applications. With the continued emergence of devices that combine printing and copying functionality, techniques and configurations are needed to generate error diffusion patterns in a manner that balances these considerations.

SUMMARY

In various embodiments, the present disclosure provides a method comprising receiving a signal that indicates selection of a first implementation or a second implementation of determining a threshold perturbation value for error diffusion halftoning of an image, and determining the threshold perturbation value using a table of programmable values according to the selected one of the first implementation or the second implementation, wherein the second implementation provides fewer threshold perturbation values for a larger region of the image than the first implementation.

In various embodiments, the present disclosure further provides receiving position information for a currently processed pixel of an image, determining one or more error weights based at least in part on the position information, and applying error diffusion halftoning to the image using the one or more error weights to distribute an error to one or more pixels other than the currently processed pixel.

In various embodiments, the present disclosure further provides an apparatus comprising a storage medium having stored thereon a table of programmable values to provide a threshold perturbation value for error diffusion halftoning of an image, and circuitry coupled to the storage medium, the circuitry configured to determine and output the threshold perturbation value using the table of programmable values according to a first implementation or a second implementation, wherein the second implementation provides fewer threshold perturbation values for a larger region of the image than the first implementation.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

The present specification describes techniques and configurations for error diffusion halftoning. In the following detailed description, reference is made to the accompanying drawings which form a part hereof wherein like numerals designate like parts throughout, and in which is shown by way of illustration embodiments in which the invention may be practiced. In general, other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use the phrases "in an embodiment," or "in embodiments," which may each refer to one or more of the same or different embodiments. The phrase "in some embodiments" may be used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "NB" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

The terms "predictor," "optimizer," "analyzer," or "system level manager" may refer to respective hardware and/or software implementing entities, and do not include a human being. For example, the operations performed by the "predictor", "optimizer," "analyzer," or "system level manager" are operations performed by the respective hardware and/or software implementations, e.g., operations that transform data representative of real things from one state to another state. Such operations do not include mental operations performed by a human being.

Error diffusion halftoning may be performed according to a variety of techniques. For example, pixels of an image may be processed in raster scan order where the image is subdivided into a sequence of scan lines or rows to systematically process the pixels of the image line by line. The scan lines or rows are typically horizontal, but may include other orientations. Such processing may be performed, for example, on an entire image at once or on discrete regions or portions of the image.

Figure 1:
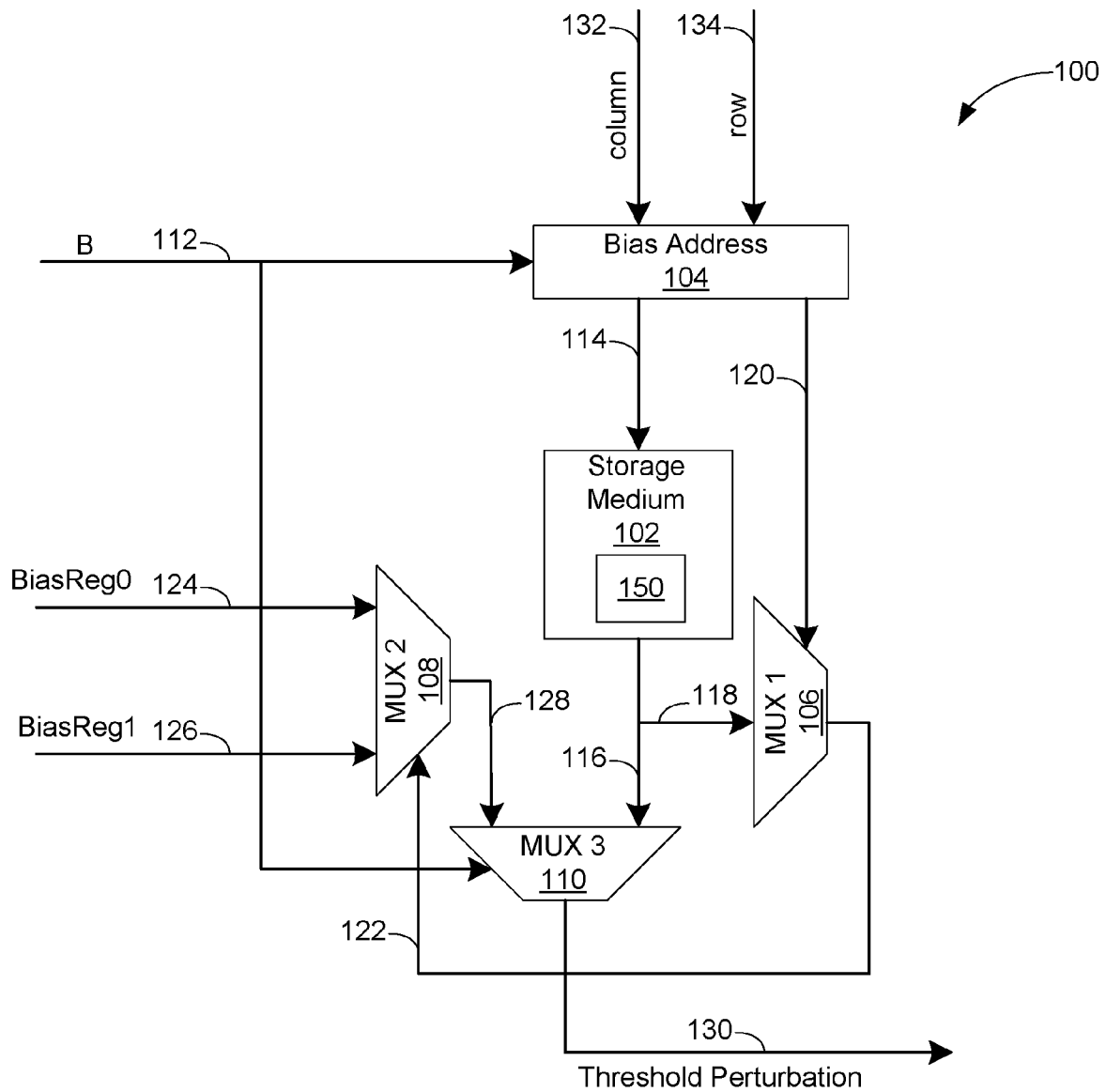
FIG. 1 schematically illustrates an example configuration of circuitry to provide threshold perturbation for error diffusion.

FIG. 1 schematically illustrates an example configuration 100 of circuitry to provide threshold perturbation for error diffusion. Configuration 100 includes a storage medium 102 having stored thereon a table 150 of programmable values. The storage medium 102, may, for example, comprise static random access memory (SRAM) of an application-specific integrated circuit (ASIC) for a printing and/or copying device, but is not limited in this regard. The storage medium 102 may be coupled with circuitry that is configured to determine and output a threshold perturbation value 130 using the table 150 of programmable values according to a first implementation or a second implementation. In an embodiment, the second implementation provides fewer threshold perturbation values for a larger region of the image than the first implementation. Thus, configuration 100 can accommodate error diffusion applications that benefit from a greater number of threshold perturbation values over a smaller region of the image according to the first implementation and error diffusion applications that benefit from a smaller number of threshold perturbation values for a larger region of the image according to the second implementation. In general, in other embodiments, a different number of implementations may be selectable.

The table 150 may be programmed with values that provide a fixed pattern of pre-determined threshold values for a region of pixels within an image. The values of table 150 may be the actual threshold values for a region of pixels or, alternatively, the values may be a signed deviation or bias from a fixed threshold value. Thus, rather than using the same threshold for all pixels or using threshold perturbation that is modulated by some form of noise (e.g., white noise provided by a random or pseudo-random number generator), table 150 provides a fixed pattern of potentially different threshold perturbation values that can be applied to a region of pixels. The values and location of values for table 150 may be selected to influence the location of error diffusion generated pixels in order to enhance image quality.

A bias address 104 may be coupled to storage medium 102 by line 114, as illustrated. In an embodiment, bias address 104 is configured to receive information about a pixel in the error diffusion halftoning process and to address the table 150 of programmable values according to the first implementation or the second implementation. The bias address 104, for example, receives position information about the pixel in process, such as row information 134 and column information 132, and accesses table 150 according to a selected first implementation or second implementation to look up a value that corresponds to the position information. For example, bias address 104 may concatenate the incoming row information 134 and column information 132 differently depending on the selected implementation. Select line B 112 is coupled to the bias address 104 to signal selection of the first implementation or the second implementation, as illustrated.

For clarity and ease of discussion of the principles described herein, in the first implementation, the table 150 of programmable values is described as a 16×16 table of 8-bit signed values that occupies 256 bytes of the storage medium 102. In the second implementation, the table 150 of programmable values is viewed as a 64×32 table of 1-bit values that occupies the same 256 bytes of the storage medium 102. The bias address 104 is configured to address the table 150 to provide these access abstractions. In one example, the 8-bit signed values of the first implementation allow a larger number of programmable values for threshold perturbation than the 1-bit values of the second implementation and the 16×16 table of the first implementation covers a smaller region of the image than the 64×32 table of the second implementation. The present subject matter is not limited in this regard, and table 150 may include any other reasonable dimension or size using signed values of other resolution in accordance with techniques described herein, according to various embodiments.

The first implementation may be referred to as a "direct" mode to indicate that a threshold perturbation value 130 is directly looked up from the table 150. In the first implementation, an 8-bit signed value of the table 150 is addressed by bias address 104 according to information (e.g., position information 132, 134) received about a pixel in process. The value from the table 150 is output via path 116 to a third multiplexer 110 (e.g., MUX 3). The third multiplexer 110 is configured to directly receive the value from the table 150 and to output the threshold perturbation value 130. The value from the table 150 may, for example, be the actual threshold value or a signed deviation from a fixed threshold value.

The third multiplexer 110 may be further configured to serve as a logic output for the threshold perturbation value 130 depending on whether the first implementation or the second implementation is selected. For example, the third multiplexer may be a 2-to-1 multiplexer and path 116 may provide an input threshold perturbation value for the first implementation and path 128 may provide an input threshold perturbation value for the second implementation. Select line B 112 may be coupled with the third multiplexer 110, as shown, to indicate which of the input paths (e.g., path 116 or 128) to output. Other techniques and/or components to output the threshold perturbation value 130 may be used in other embodiments.

The second implementation may be referred to as an "indirect" mode to indicate an indirect lookup of a threshold perturbation value 130. For example, an indirect lookup may include using a first multiplexer 106 (e.g., MUX 1) to extract information from the table 150 by line 118 according to the second implementation. The proper bit for extraction from the table 150 may be indicated by select-bit line 120 according to the position information 132, 134 received about the currently processed pixel. The first multiplexer 106 may, for example, be an 8-to-1 multiplexer that extracts a bit of an 8-bit value from the table 150 and outputs the bit to the second multiplexer 108 (e.g., MUX 2) via path 122. Other types of multiplexers may be used to accommodate other table configurations. For example, a 4-to-1 multiplexer may be used to extract a bit from a 4-bit value of table 150.

The second multiplexer 108 determines a threshold perturbation value 130 according to the value of the bit that is output from the first multiplexer 106. The bit provided by path 122 may, for example, have a value of 0 or 1 to indicate selection of line 124 or line 126. A first threshold perturbation value may be provided by line 124 (e.g., BiasReg0) and a second threshold perturbation value may be provided by line 126 (e.g., BiasReg1). The second multiplexer 108 may be a 2-to-1 multiplexer to output the threshold perturbation value 128 of the selected one of line 124 or line 126 to the third multiplexer 110, which, in turn, may output the threshold perturbation value 130 for the currently processed pixel.

More lines than lines 124 and 126 may be coupled to the second multiplexer 108 to provide more threshold perturbation values for other configurations. For example, in a case where the first multiplexer 106 is configured to output a 2-bit value via path 122, the second multiplexer 108 may be coupled with four lines corresponding with four threshold perturbation values.

Although the configuration 100 has been primarily described with respect to a 16×16 table of 8-bit signed values, other variations are possible and fall within the scope of this disclosure. For example, table 150, when viewed according to the first implementation, may be a 64×64 table of 8-bit signed values in a 4096 byte table. Such table may, for example, be used to provide a fixed pattern of threshold perturbation values for a 64×64 region of pixels. The same table, when viewed according to the second implementation, may be a 256×128 table of 1-bit values to cover a 256×128 region of pixels. In the second implementation, each pixel may have one of two threshold values corresponding to the one of two values for the bit. In yet another variation, the first or second implementation can be viewed as a 128×128 table of 2-bit signed values to cover a 128×128 region of pixels. In this variation, each pixel can select from one of four threshold values using the same 4096 byte table.

Thus, configuration 100 may provide a variety of table configurations and modes of implementation to allow trade-off between a number of threshold perturbation values and a size of a region of pixels to be programmable. Other configurations that comport with such principles provided in the examples above may be used in other embodiments.

Figure 2:
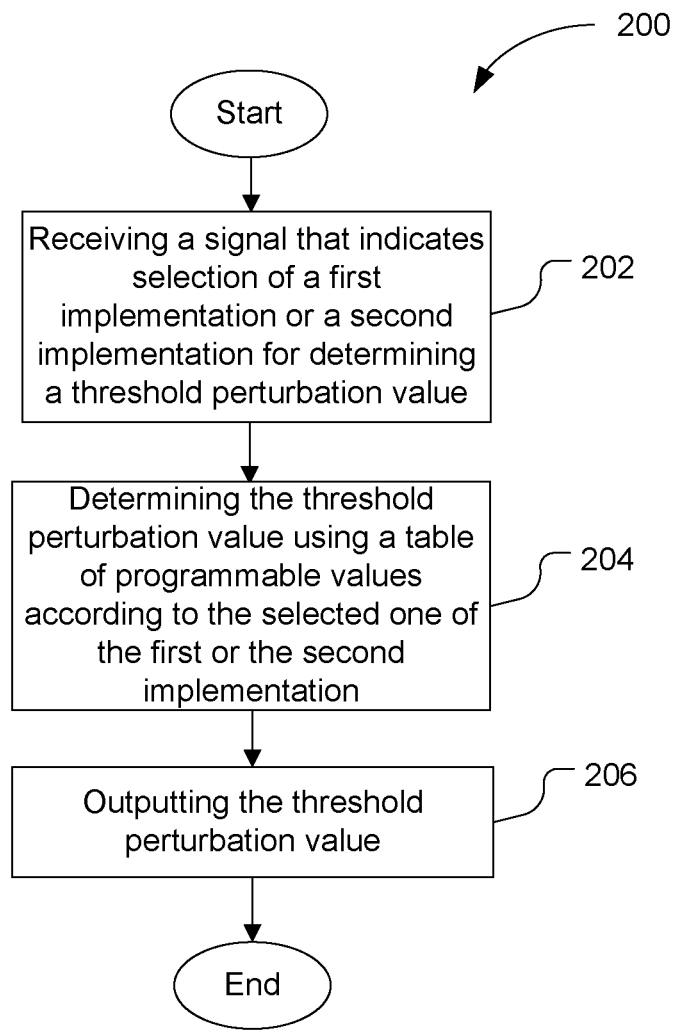
FIG. 2 is a flow diagram of a method to provide error diffusion threshold perturbation.

FIG. 2 is a flow diagram of a method 200 to provide error diffusion threshold perturbation. In an embodiment, method 200 includes receiving a signal that indicates selection of a first implementation or a second implementation for determining a threshold perturbation value, at block 202. Method 200 may further include determining the threshold perturbation value using a table of programmable values according to the selected one of the first implementation or the second implementation, at block 204. At block 206, the method 200 may further include outputting the threshold perturbation value.

At block 202, receiving the signal may be performed by the bias address 104 via select line B 112, according to one embodiment. The signal that indicates selection of the first or second implementation may be received in response to a change in mode of a device using configuration 100. For example, a printing and/or copying device may signal a change from a copying mode to a printing mode that corresponds with the selection of the first or second implementation. The signal may be generated and/or received in response to such a change in mode. Other events or changes may be used to trigger selection of the first or second implementation.

At block 204, determining the threshold perturbation value in the first implementation may be accomplished by directly looking up the threshold perturbation value from the table of programmable values 150. In the second implementation, determining the threshold perturbation value may be accomplished by indirectly looking up the threshold perturbation value. For example, in the second implementation, the threshold perturbation value may be looked up using a multiplexer to select the threshold perturbation value based at least in part on information received from the table of programmable values. The multiplexer may, for example, function according to the second multiplexer 108 of configuration 100.

Outputting the threshold perturbation value, at block 206, may be accomplished by a multiplexer configured to select a logic output for the threshold perturbation value based on whether the first or second implementation is selected. The multiplexer may function, for example, according to the third multiplexer 110 of configuration 100.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments. Method 200 may include operations or actions described with respect to FIG. 1 or elsewhere herein.

Figure 3:
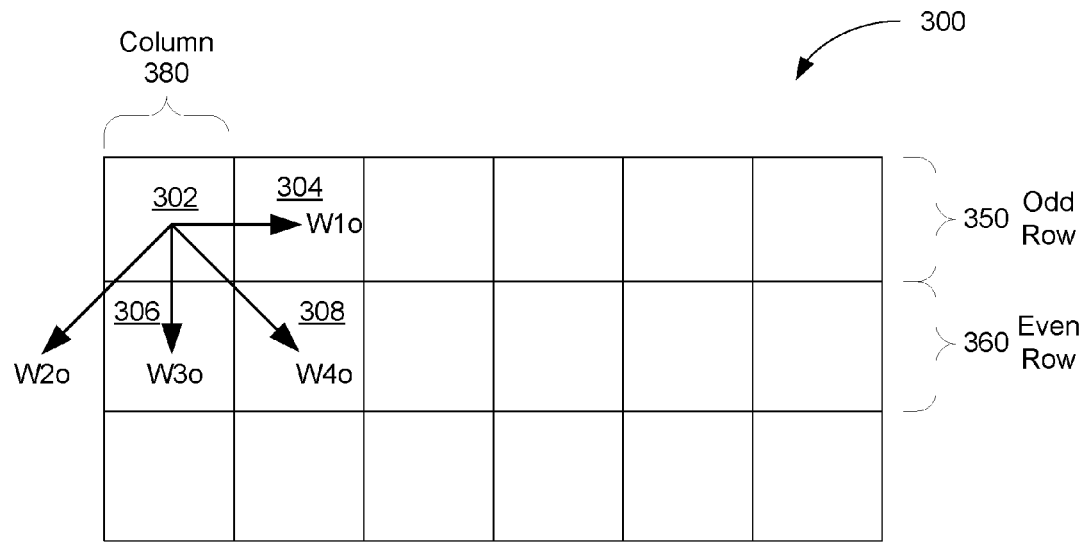
FIGS. 3-4 schematically illustrate a position dependent error weight technique for error diffusion.

FIG. 3 schematically illustrates a position dependent error weight technique for error diffusion of an image 300. In an embodiment, an error is calculated for a currently processed pixel 302 of the image 300 and distributed to one or more unprocessed pixels (e.g., pixels 304, 306, 308) using one or more error weights indicated by the arrows (e.g., W1o, W2o, W3o, W4o), where the error weights are determined, at least in part, using position information of the currently processed pixel 302.

The error weights (e.g., W1o, W2o, W3o, W4o) are typically fractions that add up to one, where one represents the total error for the currently processed pixel 302 and the fractions represent a portion of the total error to be distributed to the unprocessed pixels 304, 306, 308. Subject matter is not limited in this regard and the error weights may include other values to distribute the error.

In the illustrated example, the error of the currently processed pixel 302 is distributed to other pixels according to the pattern of error weights W1o, W2o, W3o, W4o indicated by the arrows. For example, error weight W1o is directed to pixel 304, error weight W3o is directed to pixel 306, and error weight W4o is directed to pixel 308. Error weights, such as W2o, that are not directed to any pixel of the image 300 may be discarded. Such processing may repeat for each pixel of the image 300, such that the error accumulates in unprocessed pixels according to the patterned distribution of error weights W1o, W2o, W3o, and W4o. Subject matter is not limited to the illustrated example and may include more or less error weights or other distribution schemes in other embodiments.

Position information for a currently processed pixel may be obtained or provided in a variety of ways. Each pixel of the image 300 may be associated with a row and column, which provides a unique address for each pixel. For example, currently processed pixel 302 is uniquely associated with column 380 and row 350. The columns and rows may be numbered sequentially, for example, using integers. In this regard, columns and rows may sequentially alternate between odd and even numbers (e.g., odd row 350, even row 360). Other techniques may be used to provide more or less or other types of identifiers for sequential rows and/or columns.

Such position information may be stored in memory. The position information may be received by an analyzer that determines what error weight(s) to apply based, at least in part, on the position information.

Figure 4:
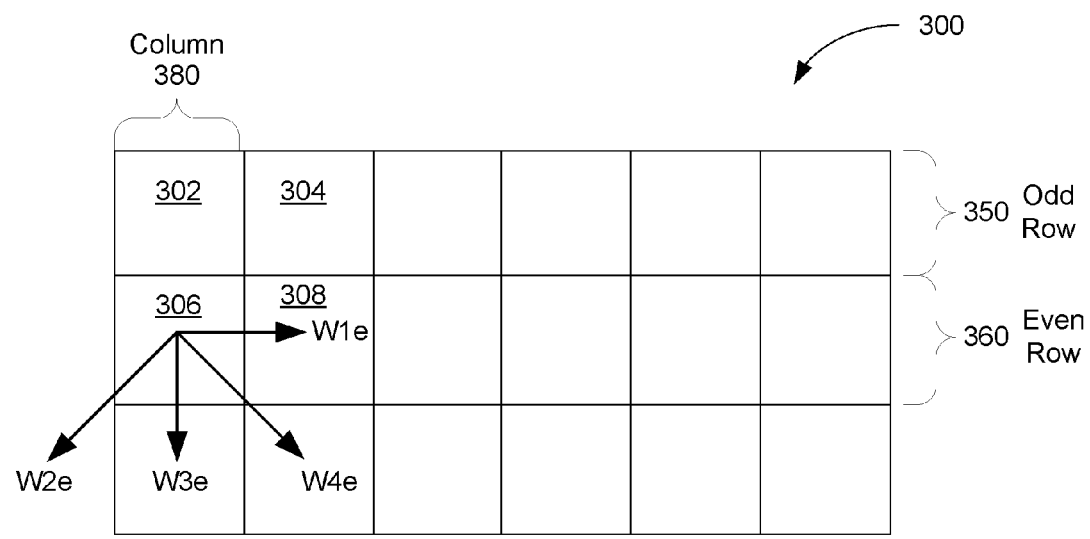

FIG. 4 schematically illustrates the same image 300 of FIG. 3, but for a different currently processed pixel 306 using a different set of error weights (e.g., W1e, W2e, W3e, W4e). As depicted in FIG. 3, a first set of error weight(s) (e.g., W1o, W2o, W3o, W4o) is used when the currently processed pixel 302 is positioned on an odd-numbered row (e.g., odd row 350) and, as depicted in FIG. 4, a second set of error weight(s) (e.g., W1$e$, W2$e$, W3$e$, W4$e$) is used when the currently processed pixel 306 is positioned on an even-numbered row (e.g., even row 360).

The first set of error weight(s) includes at least one error weight term that is different from the second set of error weight(s). For example, the first set of error weights (e.g., W1$o$, W2$o$, W3$o$, W4$o$) may have a different bias direction than the second set of error weights (e.g., W1$e$, W2$e$, W3$e$, W4$e$) or, in another example, W10 may have a different absolute value than W1$e$. In this regard, the applied error weight depends on whether the currently processed pixel is positioned on an odd-numbered row 350 or an even-numbered row 360. A different bias direction for pixels located on even and odd-numbered rows may provide similar benefits as serpentine traversal to reduce visual artifacts, but without the added complexity or silicon costs of providing serpentine data processing.

Referring still to FIGS. 3-4, a technique is disclosed to include an error weight that is not directed to a pixel of the image 300, such as error weight W2$o$ or W2$e$, in the error of the unprocessed pixels. To accomplish this, one or more of the error weights that are directed towards pixels of the image (e.g., W1$o$, W3$o$, W4$o$ or W1$e$, W3$e$, W4$e$) may be modified such that the error for pixels processed at or near an edge boundary of the image 300, such as pixels 302 and 306, is fully contained within the image 300. For example, the one or more error weights (e.g., W2$o$) that are not directed towards pixels of the image may be set to zero and the one or more error weights (e.g., W1$o$, W3$o$, W4$o$) that are directed towards pixels of the image are increased by an amount, in total, that is substantially equal to that of the one or more error weights prior to being set to zero. That is, the value of the error (e.g., W2$o$) that would otherwise be discarded is preserved in the remaining error weights (e.g., W1$o$, W3$o$, W4$o$).

To more fully illustrate this principle, the same technique can be applied to error weights W1$o$ and W4$o$ for a pixel processed at a right-most boundary edge of the image 300. Thus, for a pixel in process at the right-most boundary edge of the image 300, error weights W1$o$ and W4$o$ would be set to zero and error weights W2$o$ and W3$o$ would be incremented accordingly.

Such technique may be applied gradually. In an embodiment, one or more error weights that are to be set to zero are gradually reduced towards zero as the error diffusion processing approaches a pixel positioned at an edge boundary of the image. For example, an error weight that would not be directed to any pixels of the image 300 at or near a boundary edge of the image may be gradually reduced during processing of one or more pixels that are adjacent or near to the edge boundary. Any error weights that remain directed to pixels of the image at the boundary edge may be gradually increased in similar fashion. The edge boundary of the image 300 may be reached when a pixel does not have a directly adjacent pixel in a direction that is substantially parallel with a row (e.g., row 360) or column (e.g., column 380) of the image 300.

Figure 5:
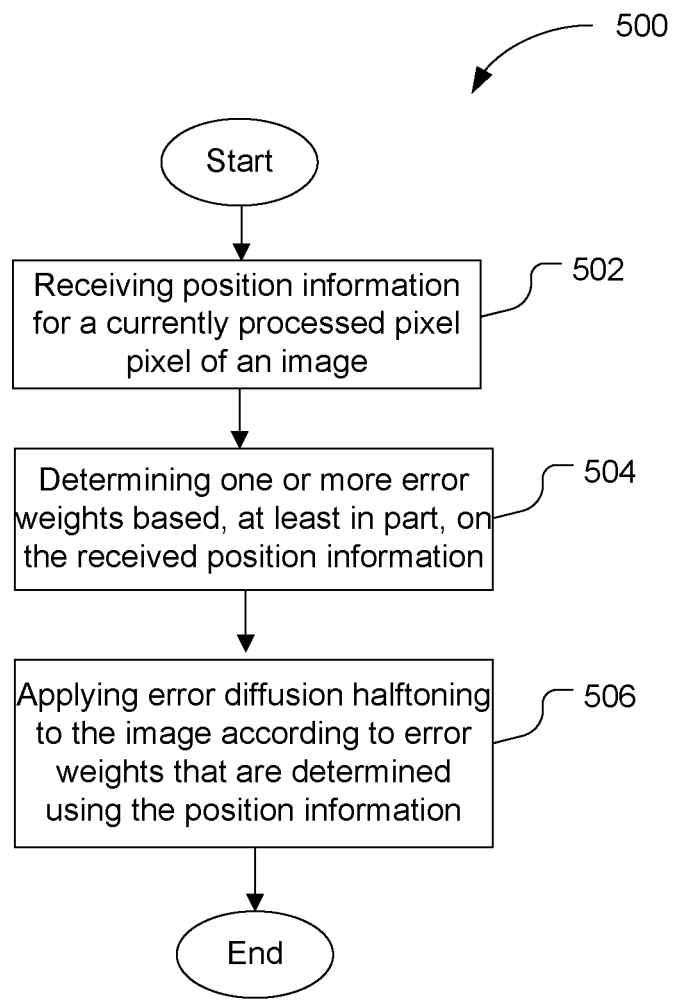
FIG. 5 is a flow diagram of an error diffusion method using position dependent error weights.

FIG. 5 is a flow diagram of an error diffusion method 500 using position dependent error weights. Method 500 includes receiving position information for a currently processed pixel of an image, at block 502. The position information, may include, for example, row and column information for the pixel or information that otherwise provides the position-dependent characteristics described herein, such as, for example, proximity to an edge boundary of the image. The position information may be stored and/or provided, for example, by any suitable method.

At block 504, method 500 further includes determining one or more error weights based, at least in part, on the received position information. Said determining one or more error weights may include selecting a first set of error weights when the currently processed pixel is positioned on an odd-numbered row of the image and selecting a second set of error weights, different from the first set, when the currently processed pixel is positioned on an even-numbered row.

Said determining one or more error weights may further include modifying the one or more error weights when the currently processed pixel is positioned at or near an edge boundary of the image such that the error is fully contained within the image. The one or more error weights may be modified by setting to zero any of the one or more error weights that are not directed towards pixels within the image and increasing one or more remaining non-zero error weights by an amount, in total, that is substantially equal to that of the one or more error weights prior to being set to zero.

Said modifying the one or more error weights may be performed gradually, by gradually reducing the one or more error weights that are to be set to zero as the error diffusion halftoning process approaches a pixel positioned at an edge boundary of the image and gradually increasing the one or more remaining non-zero error weights as the error diffusion halftoning approaches a pixel positioned at an edge boundary of the image. Such gradual increase and decrease of error weights may be performed, for example, on pixels processed near a boundary edge pixel.

Said receiving position information and said determining one or more error weights based on the received position information, according to respective blocks 502 and 504, may be performed by an analyzer. The analyzer may be operatively coupled with or part of a module that applies error diffusion halftoning. As used herein, the term "module" refers to an ASIC, an electronic circuit, a processor (shared, dedicated, or group) and memory that execute one or more software or firmware programs, a combinational logic circuit, and/or other suitable components that provide the described functionality.

At block 506, method 500 further includes applying error diffusion halftoning to the image according to error weights that are determined using the position information. In an embodiment, said applying error diffusion halftoning includes using a first set of error weight(s) when the currently processed pixel is positioned on an odd-numbered row of the image and using a second set of error weight(s) when the pixel is positioned on an even-numbered row of the image.

The error weights may be distributed to unprocessed pixels according to a variety of patterns or schemes. For example, a portion of the error may be applied to an unprocessed pixel positioned adjacent to and on the same row as the currently processed pixel and a portion of the error may be applied to each of one or more unprocessed pixels positioned on a row directly adjacent to the row comprising the currently processed pixel, where at least one of the one or more pixels is positioned directly adjacent to the currently processed pixel. Other distributions of the error may be implemented in other embodiments.

Error diffusion processing may be performed in a variety of ways. For example, the processing may include raster scan processing of rows or columns, serpentine or unidirectional traversal, or other well-known types of processing. Such processing may be performed, for example, on an entire image or on discrete regions or portions of the image.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments. Method 500 may include operations or actions described with respect to FIGS. 3-4 or elsewhere herein.

Figure 6:
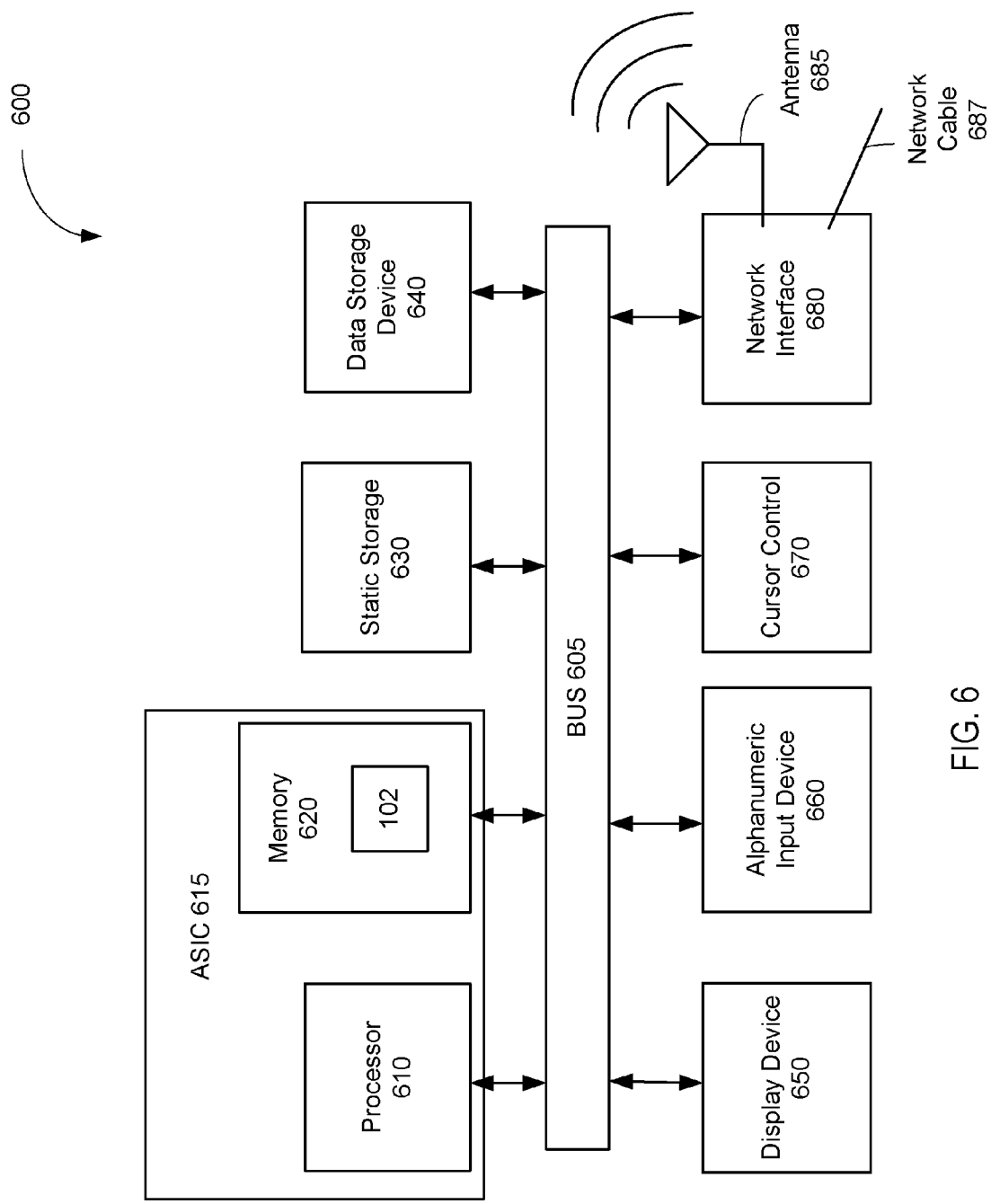
FIG. 6 is a schematic diagram of an example electronic system for implementing techniques and configurations described herein.

FIG. 6 is a schematic diagram of an example electronic system 600 for implementing techniques and configurations described herein. Electronic system 600 may comport with embodiments already described herein. Electronic system 600 is intended to represent a variety of electronic devices (either wired or wireless) including, for example, copying devices, printing devices, multi-function devices (MFD), desktop computer devices, laptop computer devices, personal computers (PC), servers, telephones, personal digital assistants (PDA) including cellular-enabled PDAs, set top boxes, pocket PCs, tablet PCs, DVD players, video players, or servers, but is not limited to these examples and may include other electronic devices. Alternative electronic systems may include more, fewer and/or different components.

Electronic system 600 includes bus 605 or other communication device or interface to communicate information, and processor 610 coupled to bus 605 that may process information. Bus 605 may be a single system bus or a number of buses of the same or different types bridged together. System 600 may include one or more processors and/or co-processors.

System 600 includes random access memory (RAM) or other storage device 620 (may be referred to as "memory"), coupled to bus 605. Memory 620 may also be used to store temporary variables or other intermediate information during execution of instructions by processor 610. Memory 620 may include a flash memory device.

Memory 620 includes a storage medium 102 as described with respect to FIG. 1. For example, the storage medium 102 may include a table 150 of programmable values to provide threshold perturbation for error diffusion. Processor 610 and memory 620 may be part of an ASIC 615 of a copying and/or printing device. Processor 610 is coupled with memory 620 to execute instructions stored thereon, that if executed, result in the actions or operations described herein.

System 600 also includes read only memory (ROM) and/or other static storage device 630 coupled to bus 605 to store static information and instructions for processor 610. Data storage device 640 may be coupled to bus 605 to store information and instructions. Data storage device 640 may include, for example, a magnetic hard disk drive (HDD).

In an embodiment, an article of manufacture is disclosed. The article of manufacture includes a storage medium such as memory 620, static storage 630, data storage device 640, or other computer-readable medium having instructions stored thereon that, if executed, result in the actions described herein. The instructions may be in the form of firmware or software according to various embodiments.

Electronic system 600 is coupled via bus 605 to display device 650, such as a cathode ray tube (CRT) or liquid crystal display (LCD), to display information to a user. Alphanumeric input device 660, including alphanumeric and other keys, may be coupled to bus 605 to communicate information and command selections to processor 610. Cursor control 670 may be another type of input device and may include, for example, a mouse, a trackball, or cursor direction keys to communicate information and command selections to processor 610 and to control cursor movement on display 650.

Electronic system 600 further includes one or more network interfaces 680 to provide access to network 620, such as a local area network, but is not limited in this regard. Network interface 680 may include, for example, a wireless network interface having antenna 685, which may represent one or more antennae. Network interface 680 may also include, for example, a wired network interface to communicate with remote devices via network cable 687, including, for example, an Ethernet cable, a coaxial cable, a fiber optic cable, a serial cable, or a parallel cable.

In one embodiment, network interface 680 provides access to a local area network, for example, by conforming to an Institute of Electrical and Electronics Engineers (IEEE) standard such as IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Previous or subsequent versions of the Bluetooth standard may also be supported.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
receiving position information for a currently processed pixel of an image;
based at least in part on the position information, determining one or more error weights; and
applying error diffusion halftoning to the image using the one or more error weights to distribute an error to one or more pixels other than the currently processed pixel, wherein applying error diffusion halftoning further comprises
using a first set of error weight(s) when the currently processed pixel is positioned on an odd-numbered row of the image, and
using a second set of error weight(s) when the pixel is positioned on an even-numbered row of the image, wherein the second set of error weight(s) is different than the first set of error weight(s), and
wherein the (i) first set of error weight(s) and (ii) second set of error weight(s) have a different bias direction.

2. The method of claim 1, wherein (i) using the first set of error weight(s) or (ii) using the second set of error weight(s) comprises:

applying a portion of the error to a pixel positioned (i) adjacent to the same row as the currently processed pixel and (ii) on the same row as the currently processed pixel; and applying a portion of the error to each of one or more pixels positioned on a row directly adjacent to the row comprising the currently processed pixel, wherein at least one of the one or more pixels is positioned directly adjacent to the currently processed pixel.

3. The method of claim 1, wherein determining one or more error weights comprises:

modifying the one or more error weights for a currently processed pixel positioned at or near an edge boundary of the image such that the error is fully contained within the image.

4. The method of claim 3, wherein modifying the one or more error weights is accomplished by:

setting to zero any of the one or more error weights that are not directed towards pixels within the image; and increasing one or more remaining non-zero error weights by an amount substantially equal to that of the one or more error weights prior to being set to zero.

5. The method of claim 4, further comprising:

gradually reducing the one or more error weights that are to be set to zero as the error diffusion halftoning approaches a pixel positioned at an edge boundary of the image; and gradually increasing the one or more remaining non-zero error weights as the error diffusion halftoning approaches a pixel positioned at an edge boundary of the image.

6. An apparatus comprising:

a storage medium having stored thereon a table of programmable values to provide a threshold perturbation value for error diffusion haftoning of an image;

a circuitry coupled to the storage medium, the circuitry configured to determine and output the threshold perturbation value using the table of programmable values according to (i) a first implementation or (ii) a second implementation, a bias address coupled to the storage medium, the bias address configured to receive information about a currently processed pixel and to address the table of programmable values according to the first implementation or the second implementation; and a select line coupled to the bias address, the select line configured to signal selection of the first implementation or the second implementation, wherein the second implementation provides fewer threshold perturbation values for a larger region of the image than the first implementation.

7. The apparatus of claim 6, wherein the circuitry comprises:

a first multiplexer configured to extract a value from the table of programmable values according to the second implementation;

a second multiplexer configured to (i) receive the extracted value and (ii) select the threshold perturbation value that corresponds to the extracted value in accordance with the second implementation; and a third multiplexer configured to output the threshold perturbation value.

8. The apparatus of claim 7, wherein the third multiplexer is further configured to (i) receive a value from the table of programmable values according to the first implementation and (ii) select a logic output for the threshold perturbation value based on whether (i) the first implementation or (ii) the second implementation is selected.

9. The apparatus of claim 6, wherein the first implementation comprises a direct lookup of a threshold perturbation value from the table of programmable values; and wherein the second implementation comprises an indirect lookup of a threshold perturbation value using a multiplexer to select the threshold perturbation value based at least in part on information received from the table of programmable values.

10. The apparatus of claim 6, wherein the threshold perturbation value is (i) an actual threshold value or (ii) a deviation from a fixed threshold value.

11. The apparatus of claim 6, wherein the storage medium comprises static random access memory (SRAM) of an application specific integrated circuit for a printing or copying device.

12. The apparatus of claim 6, wherein the table of programmable values is configured to provide a fixed pattern of predetermined threshold perturbation values for a region of the image.

13. A method comprising:

receiving position information for a currently processed pixel of an image;

based at least in part on the position information, determining one or more error weights; and applying error diffusion halftoning to the image using the one or more error weights to distribute an error to one or more pixels other than the currently processed pixel, wherein the determining further includes modifying the one or more error weights by setting to zero a first subset of the one or more error weights that are not directed towards pixels within the image, and increasing a second subset of the one or more error weights that are directed towards pixels within the image by an amount substantially equal to that of the first subset of the one or more error weights prior to the first subset of the one or more error weights being set to zero.

14. The method of claim 13, further comprising:

gradually reducing the one or more error weights that are to be set to zero as the error diffusion halftoning approaches a pixel positioned at an edge boundary of the image; and gradually increasing the one or more remaining non-zero error weights as the error diffusion halftoning approaches a pixel positioned at an edge boundary of the image.

15. An apparatus comprising:

a storage medium having stored thereon a table of programmable values to provide a threshold perturbation value for error diffusion halftoning of an image, and a circuitry coupled to the storage medium, the circuitry configured to determine and output the threshold perturbation value using the table of programmable values according to (i) a first implementation or (ii) a second implementation, wherein the circuitry comprises a first multiplexer configured to extract a value from the table of programmable values according to the second implementation, a second multiplexer configured to (i) receive the extracted value and (ii) select the threshold perturbation value that corresponds to the extracted value in accordance with the second implementation, and a third multiplexer configured to output the threshold perturbation value wherein the second implementation provides fewer threshold perturbation values for a larger region of the image than the first implementation.

16. The apparatus of claim 15, wherein the third multiplexer is further configured to (i) receive a value from the table of programmable values according to the first implementation and (ii) select a logic output for the threshold perturbation value based on whether (i) the first implementation or (ii) the second implementation is selected.

* * * * *